United States Patent [19]

Kopich

[11] 4,429,590

[45] Feb. 7, 1984

[54] PARKING BRAKE ACTUATOR MECHANISM

[75] Inventor: Leonard F. Kopich, Madison Heights, Mich.

[73] Assignee: General Motors Corporation, Detroit, Mich.

[21] Appl. No.: 247,727

[22] Filed: Mar. 26, 1981

[51] Int. Cl.³ .............................................. G05G 5/06
[52] U.S. Cl. ........................................ 74/535; 74/538; 74/517
[58] Field of Search ................ 74/535, 536, 537, 538, 74/517, 573, 501 R

[56] References Cited

U.S. PATENT DOCUMENTS

| | | | |
|---|---|---|---|
| 2,155,062 | 4/1939 | Sandberg | 74/536 |
| 2,897,686 | 8/1959 | Hinsey | 74/540 |
| 3,302,482 | 2/1967 | Szajner et al. | 74/517 |
| 3,335,621 | 8/1967 | Buchwald | 74/535 |

*Primary Examiner*—Leslie A. Braun
*Assistant Examiner*—Anthony Raskob, Jr.
*Attorney, Agent, or Firm*—D. D. McGraw

[57] ABSTRACT

The hand lever operating mechanism is positioned beside a vehicle seat and remains below the level of the seat upper surface throughout its operating range. It provides an increase in parking brake cable travel without a conventional lever arm increase in radius from the fulcrum. The anchor point of the cable is self-contained in the unit and may be angularly varied to change the ratio through a range of 2:1 to 1:1.

3 Claims, 2 Drawing Figures

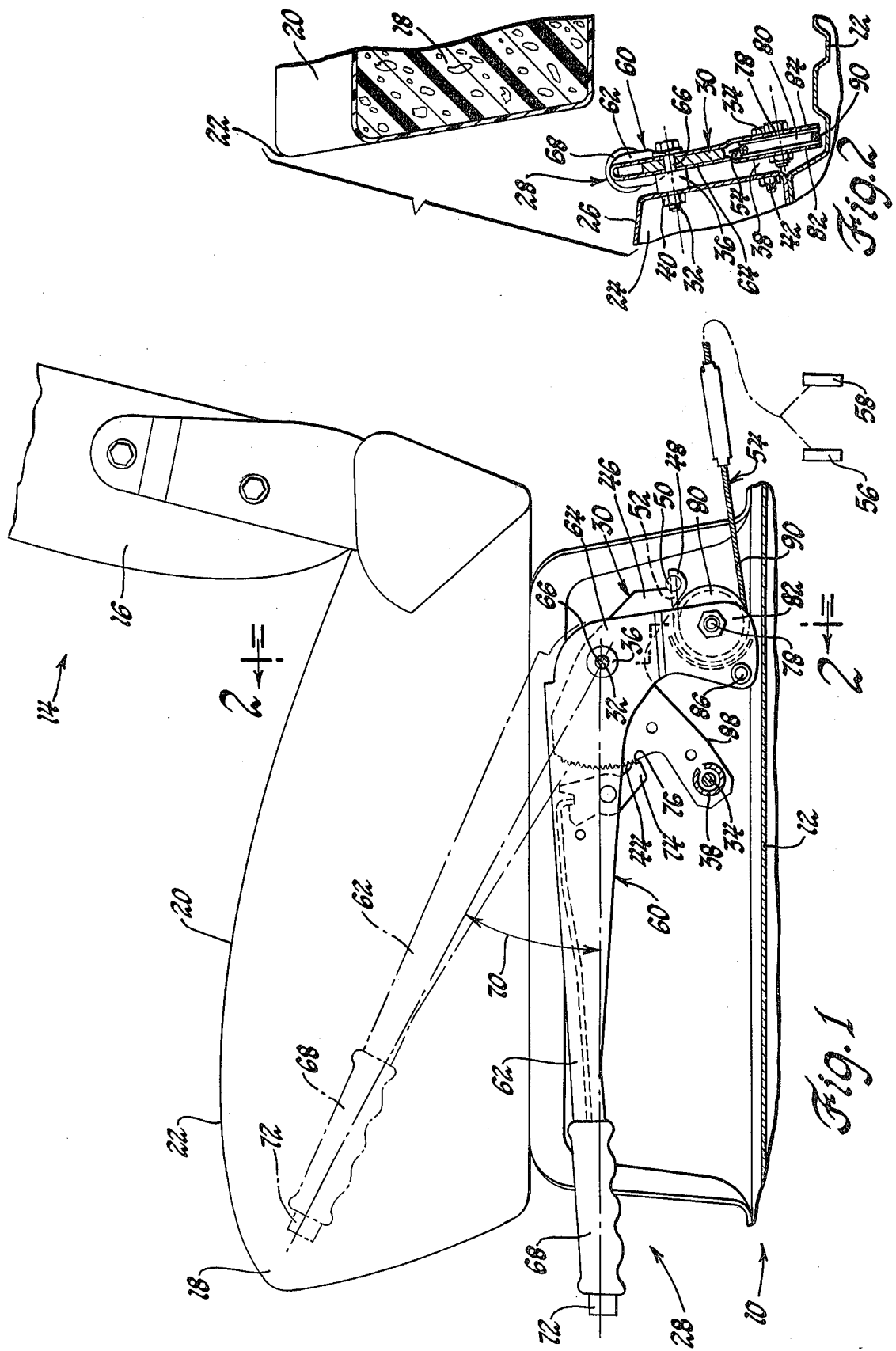

PARKING BRAKE ACTUATOR MECHANISM

The invention relates to a parking brake actuating mechanism in a vehicle, including a handle assembly pivotable about a fulcrum when operated by an occupant of the vehicle. The mechanism includes a stationary ratchet and cable grounding member. A pulley fastened to the handle assembly has a flexible parking brake cable reaved over it and tensioned as the handle assembly moves the pulley arcuately. By so securing the fixed end of the cable to the cable grounding member that the cable passes around a semicircumferential portion of the pulley, a 2:1 ratio of cable movement to pulley axis movement is attained. The anchor point of the cable grounding member may be varied angularly so that a smaller circumferential arc of the pulley is engaged by the cable, varying the ratio between 2:1 and 1:1. When used with a 2:1 ratio, the mechanism is particularly adapted to be placed beside a vehicle occupant seat of a passenger car, and to remain below seat level at all times, whether the mechanism is in the parking brake released or fully applied position. This is especially helpful when the seat level is relatively low. In vehicles having somewhat higher seat levels in relation to the mounting of the parking brake actuator mechanism, such as may be found in small trucks or vans, it may at times be appropriate to use a smaller ratio and somewhat greater arcuate movement of the handle assembly of the mechanism, while still having the advantage of keeping the mechanism entirely below seat level.

It is advantageous in some vehicle designs to keep the handle below seat level under all conditions of operation, particularly when the parking brake actuator mechanism is mounted beside a seat and immediately adjacent a vehicle door through which the occupant moves to enter or leave the vehicle. Thus at no time does the handle assembly protrude into the area through which the occupant must pass. Such an arrangement would also be advantageous with separate front seats such as bucket seats, if the mechanism is placed between the seats.

IN THE DRAWING

FIG. 1 is an elevation view of a portion of an automotive vehicle having parts broken away and in section and illustrating a mechanism embodying the invention.

FIG. 2 is a fragmentary cross section view taken in the direction of arrows 2—2 of FIG. 1 and having parts broken away.

The relevant portions of the vehicle in which the mechanism embodying the invention is installed are illustrated in FIG. 1. The vehicle 10 has a body pan 12 extending beside and underneath the vehicle occupant seat assembly 14. The seat assembly includes a back 16 and a seat 18. The seat upper surface 20 determines the seat level, and in particular the edges 22 of the seat upper surface 20 remain substantially at the same seat height whether or not an occupant is sitting in the seat. Therefore for purposes of the description of the invention the seat level is considered to be defined by the seat upper surface 20. The seat is suitably mounted in the vehicle by means, not shown, so that it has a position relative to pan 12. As better shown in FIG. 2, a vehicle body member 24 is secured to the side of pan 12 with the upper surface of body member 24 defining a door sill 26. In the particular illustration in the drawing, the door sill 26 is on the left side of the vehicle and the seat assembly 14 is the seat occupied by the vehicle operator. It is to be understood that the body member 24 may under some conditions be in the center of the vehicle. In this arrangement, seat assembly 14 would be the right-hand seat which is occupiable by a passenger in a left-hand drive car. The handle of the mechanism embodying the invention would then be on the right side of the seat normally occupied by the vehicle operator.

The hand operated parking brake actuator mechanism 28 embodying the invention includes a fixed mounting bracket 30 which is fixed to the vehicle body member 24 by a suitable arrangement such as bolts 32 and 34, spacers 36 and 38, and nuts 40 and 42. The nuts may be secured to the body member for easy removal and replacement of mechanism 28. The mounting bracket 30 has a toothed arcuate rack sector 44 formed on one portion thereof. It also has an arm 46 extending rearwardly and downwardly relative to mounting bolt 32. The end of bracket arm 26 is illustrated as being formed to provide a cupped clevis 48 arranged to receive a bead 50 on the end 52 of the flexible cable 54. Flexible cable 54 is the cable which is tensioned by actuation of mechanism 28 to apply the parking brakes 56 and 58. These brakes are illustrated as being typical parking brakes incorporated as a part of the rear wheel brake assemblies. It is to be understood that other types of parking brake mechanisms actuatable by tensioning a flexible cable may be provided. Such brakes include, but are not limited to, a drive shaft parking brake and front wheel parking brakes. However, for purposes of description of the mechanism embodying the invention the illustrated arrangement of a rearwardly extending cable 54 will be described.

A lever 60, which is generally "L" shaped, includes a first arm 62 and a second arm 64 which is the shorter length arm. The lever 60 is pivoted at a first pivot point 66 on bracket 30. The pivot point 66 is the axis of the mounting bolt 32. The lever arm 62 is illustrated as extending generally forward in the vehicle. In the mechanism released position it is substantially horizontal, as shown in solid lines in FIG. 1. Lever arm 62 includes a hand grip 68 positioned to be grasped by a vehicle occupant and moved arcuately upward to actuate the parking brakes 56 and 58. The arcuate distance 70 through which the lever arm 62 is movable is illustrated in FIG. 1, with the maximum height position of the lever arm 62, and particularly its outer end where the hand grip 68 is located, being illustrated by phantom lines. A release button 72 is located in the hand grip 68 and is suitably connected to operate a pawl 74, which is pivoted on a portion of lever arm 62 so that the pawl teeth 76 are positioned for engagement and disengagement with the teeth of rack sector 44. The button release and lock mechanism, including pawl 74, is sufficiently well known in the art so as to require little additional detailed description of operation. It is considered sufficient to state that the pawl teeth 76 engage the rack to prevent the lever arm 62 from returning to the release position until button 72 is positioned to move the pawl out of engagement with the teeth of the rack sector. While so disengaged, the lever arm 62 may be moved from a parking brake applied position toward the release position.

A second pivot point 78 is located on the second arm 64 of lever 60 and is much closer to first pivot point 66 than is the handle grip 68. A pulley 80 is rotatably mounted on lever 60 at second pivot point 78. In the particular construction illustrated, the second arm 64 is made of two substantially parallel sections 82 and 84 so that the pulley 80 is positioned between these sections. The fixed mounting bracket arm 46 extends between sections 82 and 84 so that the cable end 52 is located radially outward of pulley 80 but adjacent the pulley so that cable 54 passes around a substantially semi-circumferential portion of the pulley 80. As seen in the drawing, the cable 54 extends generally forwardly of the vehicle from its end 52, passes around the semi-circumferential portion of pulley 80, and then extends generally rearwardly of the vehicle toward parking brakes 56 and 58. A suitable stop 86 is provided on the second arm 64 so as to be engageable with an edge 88 of mounting bracket 30, effectively limiting the amount of arcuate movement of lever arm 62 to the arc 70 illustrated. A mechanical advantage based on the effective length of lever arm 62 to the effective length of second arm 64 is obtained.

As described in greater detail below, this particular arrangement will move the flexible cable output portion 90 a linear distance which is two times as much as is the arcuate but effectively linear distance movement of the second pivot point 78 since the cable end 52 is fixed. Thus a 2:1 ratio is attained. If a lesser ratio is desired, for example 1.5:1, the location of the mounting means for cable end 52 is positioned closer to the line joining the first pivot point 66 and the second pivot point 78, placing the cable end 52 in a more vertical relation. If the cable end 52 is so located that it is substantially perpendicular to the cable output portion 90, and therefore considerably closer to pivot point 66, a 1:1 ratio is obtainable.

Normally when a vehicle is parked and the parking brakes are fully applied, the lever arm 62 is at the upper end of arc 70 as shown in phantom lines in FIG. 1. Stop 86 will be engaged by bracket 30 at 88. Pulley 80 will be positioned arcuately leftward, having its pivot point 78 moved arcuately about pivot 66, and cable 54 will be under tension. Pawl 74 will be so engaged with teeth of rack sector 44 as to hold the lever arm 62 against downward movement. When the vehicle is to be occupied, it is common for the person to enter the vehicle through the door and slide onto the seat 18 in a somewhat crouching position. By assuring that the lever arm 62 is positioned below the seat upper surface 20 with the parking brakes applied, there is no inteference by the parking brake mechanism with the occupant's entry. The same is true when the parking brake mechanism has been applied and the occupant leaves the vehicle.

After entering the vehicle, the occupant may press the release button 72, disengaging pawl 74 from sector 44 while gripping the hand grip 68, and permit the lever 60 to be pivoted counterclockwise as seen in FIG. 1 downward through arc 70 to the released position illustrated in solid lines in that Figure. This movement is reflected in movement of pivot point 78 arcuately rearward with pulley 80 also moving arcuately rearward and rotating so that the flexible cable 64 is no longer tensioned sufficiently to maintain the parking brakes 56 and 58 in an actuated condition.

When the parking brakes are to be applied, the vehicle occupant merely grasps the hand grip 68 and moves lever arm 62 upwardly through arc 70. Pawl 74 will preferably ratchet on rack sector 44, again engaging the appropriate teeth for holding the mechanism in the parking brake applied position. The flexible cable 54 is therefore again tensioned and the parking brakes 56 and 58 are again actuated. The occupant may then leave the vehicle while passing over the lower arm 62 without any inteference from the lever arm. If the parking brake mechanism 28 is positioned between divided front seats of a vehicle, an occupant may more easily slide from one front seat across to the other when he desired to move to the other side of the vehicle. Thus the parking brake mechanism will not interfere with such movement, which may occur when for some reason the occupant desires to exit from the far side of the vehicle from which he was sitting.

The embodiments of the invention in which an exclusive property or privilege is claimed are defined as follows:

1. In a motor vehicle having a vehicle operator seat including a seat upper surface defining the seat level, and a hand operated parking brake actuating mechanism mounted along one side of the seat and below seat level, said parking brake actuating mechanism comprising:

a fixed mounting bracket having an arcuate sector, an arm providing means for attaching one end of a flexible cable thereto, and a first pivot point;

a brake lever handle assembly pivotally mounted on said bracket at said first pivot point for generally vertical planar pivoted movement alongside said seat and only within an arc wherein the handle assembly remains below the level of the seat upper surface throughout the arc, said handle assembly including:

a lever arm including a hand grip adapted to be moved arcuately about said first pivot point by the vehicle operator to apply and release a parking brake, said lever arm having an established length between said hand grip and said first pivot point, means for selectively latching and releasing said handle assembly by engagement and disengagement with said arcuate sector, said handle assembly further having a second arm movable arcuately about said first pivot point with said lever arm and having a second pivot point thereon and an established length between said first and second pivot points which is less than said lever arm established length, a pulley rotatably mounted on said second arm at said second pivot point to provide a mechanical advantage established by the relationship of the length of said lever arm between said hand grip and said first pivot point to the lesser length of said second arm between said first and second pivot points;

and a flexible tension force transmitting brake actuating cable having one end secured to said fixed bracket by said attaching means, said cable passing around an arcuate substantially semi-circular portion of said pulley and extending tangentially therefrom to a cable output portion adapted to be operatively connected to the parking brake, said cable output portion moving linearly to apply the parking brake for a distance equal to at least twice the arcuate distance moved by said second pivot point when said lever arm is moved arcuately to apply the parking brake so that full travel of said cable output portion for full parking brake application is obtained by movement of said lever arm within said arc wherein said brake lever handle assembly remains below the level of the seat upper surface, whereby to facilitate unencumbered entry and exit to and from the vehicle operator seat over said brake lever handle assembly by the vehicle operator.

2. In a motor vehicle having a vehicle operator seat including a seat upper surface defining the seat level, and a hand operated parking brake actuating mechanism mounted along one side of the seat and below seat level, said parking brake actuating mechanism comprising:

a fixed mounting bracket having an arcuate sector, an arm providing means for attaching one end of a flexible cable thereto, and a first pivot point;

a brake lever handle assembly pivotally mounted on said bracket at said first pivot point for generally vertical planar pivoted movement alongside said seat and only within an arc wherein the handle assembly remains below the level of the seat upper surface throughout the arc, said handle assembly including:

a lever arm including a hand grip adapted to be moved arcuately about said first pivot point by the vehicle operator to apply and release a parking brake, said lever arm having an established length between said hand grip and said first pivot point, a pawl pivotally mounted on said lever arm and selectively engaging said arcuate sector to latch or release said handle assembly, said handle assembly further having a second arm movable arcuately about said first pivot point with said lever arm and having a second pivot point thereon and an established length between said first and second pivot points which is less than said lever arm established length, a pulley rotatably mounted on said second arm at said second pivot point to provide a mechanical advantage established by the relationship of the length of said lever arm between said hand grip and said first pivot point to the lesser length of said second arm between said first and second pivot points;

and a flexible tension force transmitting brake actuating cable having one end secured to said fixed bracket by said attaching means, said cable passing around an arcuate portion of said pulley to a cable output portion extending tangentially from said pulley and adapted to be operatively connected to the parking brake, the point of tangential extension from said pulley being on the side of said secnd pivot point away from said first pivot point, said cable output portion moving linearly to apply the parking brake for a distance equal to at least twice the arcuate distance moved by said second pivot point when said lever arm is moved arcuately to apply the parking brake so that full travel of said cable output portion for full parking brake application is obtained by movement of said lever arm within said arc wherein said brake lever handle assembly remains below the level of the seat upper surface.

3. In a motor vehicle having a vehicle operator seat including a seat upper surface defining the seat level, and a hand operated parking brake actuating mechanism mounted along one side of the seat and below seat level, said parking brake actuating mechanism comprising:

a fixed mounting bracket having a toothed arcuate rack sector, an arm providing means for attaching one end of a flexible cable thereto, and a first pivot point;

a brake lever handle assembly pivotally mounted on said bracket at said first pivot point for generally vertical planar pivoted movement alongside said seat and only within an arc wherein the handle assembly remains below the level of the seat upper surface throughout the arc, said handle assembly including:

a lever arm including a hand grip adapted to be moved arcuately about said first pivot point by the vehicle operator to apply and release a parking brake, said lever arm having an established length between said hand grip and said first pivot point, a toothed pawl pivotally mounted on said lever arm and selectively engaging said toothed arcuate rack sector to latch or release said handle assembly, said handle assembly further having a second arm movable arcuately about said first pivot point with said lever arm and having a second pivot point thereon and an established length between said first and second pivot points which is less than said lever arm established length, a pulley rotatably mounted on said second arm at said second pivot point to provide a mechanical advantage established by the relationship of the length of said lever arm between said hand grip and said first pivot point to the lesser length of said second arm between said first and second pivot points;

and a flexible tension force transmitting brake actuating cable having one end secured to said fixed bracket by said attaching means, said cable passing around an arcuate portion of said pulley to a cable output portion extending tangentially from said pulley and adapted to be operatively connected to the parking brake, said attaching means being so located on said bracket that the portion of said pulley engaged by said cable is at least a quadri-circumferential arc and no more than a semi-circumferential arc, wherein the effective ratio of substantially linear movement of said cable output portion to movement of said second pivot point from the release to the fully applied position is between 1:1 and 2:1, and the desired ratio is selected by the location of said attaching means, and full travel of said cable output portion for full parking brake application is obtained by movement of said lever arm within said arc wherein said brake lever handle assembly remains below the level of the seat upper surface.

* * * * *